Figure 1:
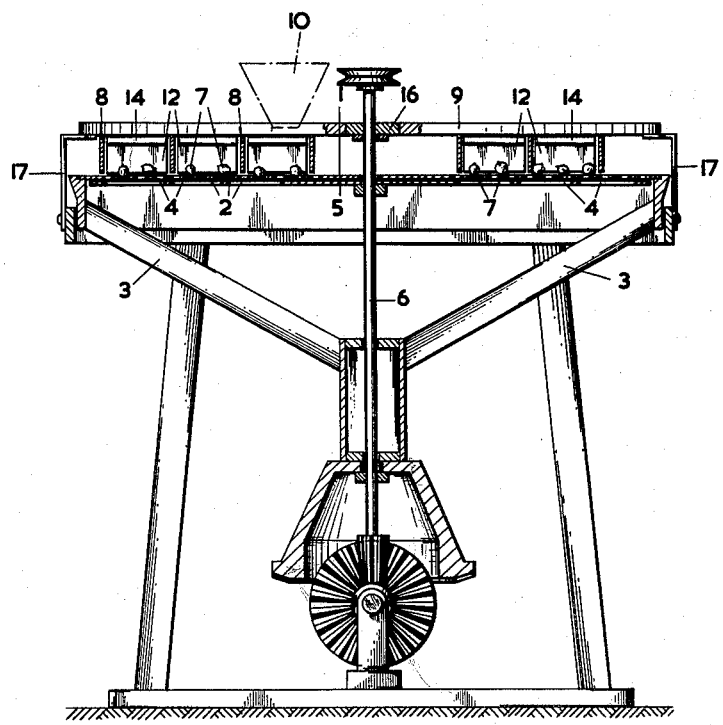

March 23, 1965    D. C. VAN DER VIJVER    3,174,520
ONION END CUTTER

Filed Dec. 14, 1962    2 Sheets-Sheet 1

March 23, 1965  D. C. VAN DER VIJVER  3,174,520
ONION END CUTTER
Filed Dec. 14, 1962  2 Sheets-Sheet 2
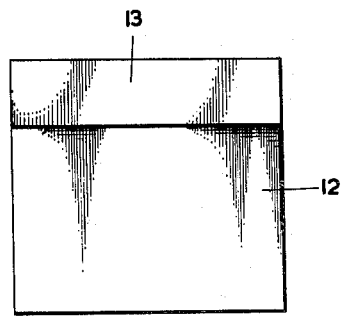
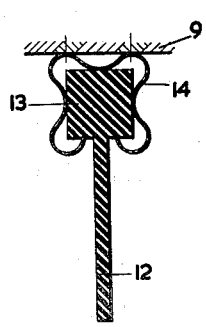 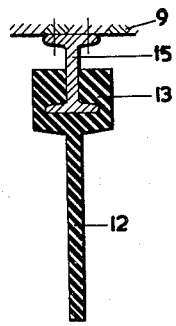

United States Patent Office 3,174,520
Patented Mar. 23, 1965

3,174,520
ONION END CUTTER
Dirk Cornelis van der Vijver, Leyden, Netherlands, assignor to Spyer Brothers & van der Vijver N.V., Rijnsburg, Netherlands
Filed Dec. 14, 1962, Ser. No. 244,619
1 Claim. (Cl. 146—83)

This invention relates to a machine for removing protruding parts from more or less spherical agricultural products, in particular from onions such as small silver skin onions, said machine being provided with a rotating plate having openings therein, on which plate the products are adapted to lie in operation and to be moved therewith in a path, bordered by the turns of a spiral separating wall positioned above the plate and supported by a supporting structure, a set of rotating knives being provided immediately below the plate to cut off parts of the agricultural products extending downwards through the openings of the plate, there being also provided above the plate and free from contact therewith a set of flexible holding members connected to and suspended from the said supporting structure for keeping the products down on the plate and for retarding them in relation to the movement of the plate.

Machines of the above-described types are well known. Their operation is based upon the fact that the products will at some time during the movement through the machine take up a position in which the protrusions to be removed from the products extend through the openings in the plate and are cut off by the knives. For such operation it is necessary that the products are kept down on the plate and are prevented from moving always at the same speed as the plate so as to give them a rolling movement on the plate.

It is known to apply as flexible holding means chains either formed as a horizontal chain mat at some distance above the plate or as separate mutually independent hanging lengths of separate metal chains. Moreover it is known to apply fingers, rings or loops, not only from metal, but also from plastic material or rubber.

Such known means have several disadvantages. Metal chains are heavy and in general metal parts have the disadvantage that, e.g. after corrosion, a broken part will fall through an opening in the plate and will cause serious damage to the knives and the plate. Separate chain lengths, fingers and the like as known yield in a radial direction as easily as in the circumferential direction of the plate or even they are often embodied so that they yield more easily in a radial direction than in a circumferential direction.

This invention is based upon the idea that the holding means should be free from the disadvantage of metal as stated and that holding members yielding too easily in the radial direction of the plate often do not give sufficient rolling of the products about horizontal axes. In order to avoid such disadvantages a machine as described in the first paragraph of this specification is according to this invention characterized in that said holding members are embodied as sheets of rubber or a comparable relatively soft elastic material extending substantially radially with respect to the plate and having a radial dimension substantially equal to the radial distance between the turns of the spiral separating wall.

Such sheets will give an elastic holding action on the products by their inherent elasticity contrary to what happens with chains acting only by their gravity and this has appeared to be an improvement. The products are intensively rolled about horizontal axes when contacting the sheets.

The sheets keep the products lightly and elastically onto the plate and it has appeared that they improve the efficiency, capacity and quality of operation of machines of the given kind. Such sheets can easily be made in any desired size and shape, they can easily be mounted into and removed from the machine, they are corrosion-resistant and can never be the cause of damage to the knives.

It has appeared that application of the invention is particularly advantageous together with openings in the plate embodied as substantially circumferentially extending slots.

The invention will now be explained more fully on the basis of the annexed drawing giving by way of example only a machine according to this invention.

FIG. 1 gives a more or less diagrammatic vertical cross section of the essential parts of such a machine.

FIGS. 2, 3 and 4 give on a larger scale details of the sheets of this machine.

The machine of FIG. 1 has a thin circular steel plate 1, being provided with a large number of slots 2 directed either radially, circumferentially or along inclined lines between radial and circumferential, but preferably about circumferentially, said slots being of limited circumferential length. The plate is along its periphery rigidly connected to a part 3, which during the operation of the machine is rotated relatively slowly by a simple drive below the plate.

Along the lower surface of the plate 1 knives 4 are arranged, supported by and connected to a knife carrier disk 5. This disk is mounted on shaft 6, which in operation is driven at high speed from external drive means through a pulley at the upper end thereof. Shaft 6 is below the plate 4 provided with a suitable bevel gear wheel in engagement with other such wheels of such a gear ratio and arranged so that part 3 is rotated by shaft 6 but with a much lower speed.

Several of the products, here imagined to be silver-skin onions, are shown in FIG. 1 and they are indicated by 7. They should move in a continuous flow over the plate 1. In order to make the path of the onions over the plate 1 as long as possible, it is preferable to give this path the shape of a spiral. The turns of this spiral are separated mutually by a spiral separating wall 8. This wall 8 is suspended over the plate 1 to a supporting structure 9 so as to leave a small clearance between the lower edge of the wall 8 and the plate 1.

The onions are fed to the plate 1 from a hopper 10 positioned near the center of the plate, and at the outer periphery of the plate 1 there are means to collect the onions after they leave the spiral path.

In order to keep the onions on the plate 1 and to retard their movement together with the plate 1, a considerable number of rubber sheets 12 is provided one behind the other in the spiral path of the onions, said sheets 12 are with their upper edges mounted in the supporting structure 9 and can move elastically in the direction of said path with their lower ends. By means of an eccentric 16 secured to the rotating shaft 6 rotating the knives 4 it is possible to give a small rotational movement to the axis of the supporting structure 9, which is movably supported on supports 17 in the stationary structure. The structure 9 is prevented from rotating itself about its axis, so that only its axis moves rotationally, all points of the structure making circular movements along a circle with the same radius as the radius of the rotational movement of the axis. Such eccentric movement of the supporting structure with the spiral separating wall 8 and the rubber sheets 12 gives a better through-flow of the products such as the onions along the spiral path through the machine.

The sheets 12 are positioned substantially radially with respect to the plate 8 and in a considerable number, one behind the other, along the entire spiral path through the machine.

FIG. 2 gives on a larger scale such a rubber sheet 12 in front elevation. It has an enlarged upper edge 13, by which it can be connected to the supporting structure in a manner now to be described.

FIG. 3 shows in cross-section a sheet 12 with such an enlarged head 13 according to FIG. 2, in which the head 13 is solid and a metal profile 14 rigidly connected to the supporting structure 9 surrounds said head almost completely. The sheet 12 can easily be slid with its head 13 into the profile 14, e.g. after dismantling the structure and after removing the separating wall 8 from the supporting structure 9.

According to another embodiment shown in the cross-section of FIG. 4 the enlarged head 13 of the sheet is provided with a reversed-T-shape recess, by which the sheet 12 can be slid upon the connecting rail 15 rigidly connected to the supporting structure 9.

During movement of the products such as the onions 7 with the rotating plate 1 said products tend to move through the spiral path with about the same speed as said plate. By each sheet 12 they are kept onto the plate but retarded with respect thereto, so that they tend to roll, thus increasing the chance that the parts to be cut off (the tops and tails) will extend through the slots in the plate 1 and thus are cut off by the knives 4.

What I claim is:

A machine for removing protruding parts from generally spherical agricultural products, such as small silver skin onions, said machine comprising a rotating horizontally disposed plate on which said products lie while being conveyed thereby in a spiral path, a spiral separating wall suspended above said plate to define said spiral path, a radially extending supporting structure from which said wall is suspended, said plate having a plurality of spaced circumferentially extending openings therethrough adapted to allow the protruding parts of said products to project downwardly therethrough below the plate, a plurality of rotating knives mounted immediately below the plate adapted to cut off said protruding parts, a plurality of vertically disposed circumferentially spaced, flexible sheet holding members extending transversely across the spiral path at intervals therealong and suspended from the supporting structure above the plate, said members being uninterrupted sheets of flexible material, such as rubber, extending continuously for substantially the entire radial distance between each of the turns of the spiral separating wall and serving to hold said products down on the plate and retard their movement in relation to that of the plate, each of said sheets having an enlarged upper end removably secured to the supporting structure and having its lower end free to flex only in a direction circumferentially of the rotating plate in retarding contact with the advancing products being conveyed by the rotating plate, and a plurality of radially extending profiled metal channels mounted on the supporting structure for slidably receiving the sheets to provide the aforesaid removable securing thereof.

References Cited by the Examiner
UNITED STATES PATENTS

| | | | |
|---|---|---|---|
| 1,635,569 | 7/27 | Ayars | 146—83 |
| 2,906,308 | 9/59 | Genetti | 146—43 |
| 3,057,385 | 10/62 | Kuilman | 146—83 X |

FOREIGN PATENTS

| | | |
|---|---|---|
| 725,521 | 3/55 | Great Britain. |

J. SPENCER OVERHOLSER, *Primary Examiner.*